United States Patent
Pesavento

(10) Patent No.: US 6,200,697 B1
(45) Date of Patent: Mar. 13, 2001

(54) CARBON-AIR FUEL CELL

(75) Inventor: Philip V. Pesavento, Lomita, CA (US)

(73) Assignee: Scientific Application & Research Associates, Inc., Huntington Beach, CA (US)

(*) Notice: Subject to any disclaimer, the term of this patent is extended or adjusted under 35 U.S.C. 154(b) by 0 days.

(21) Appl. No.: 09/280,929

(22) Filed: Mar. 29, 1999

Related U.S. Application Data

(63) Continuation-in-part of application No. 08/974,321, filed on Nov. 19, 1997.
(60) Provisional application No. 60/031,678, filed on Nov. 22, 1996.

(51) Int. Cl.[7] .................................................. H01M 4/00
(52) U.S. Cl. ............................... 429/28; 429/29; 429/34; 429/16; 429/46; 429/44
(58) Field of Search .................................. 429/27, 28, 29, 429/16, 19, 41, 44, 46

(56) References Cited

U.S. PATENT DOCUMENTS

| | | | |
|---|---|---|---|
| 4,436,794 | * | 3/1984 | Takeuchi et al. .................... 429/40 |
| 5,047,299 | * | 9/1991 | Shockling ........................... 429/20 |
| 5,422,195 | * | 6/1995 | Bernard . | |
| 5,688,610 | * | 11/1997 | Spaeh et al. ........................ 429/30 |
| 5,750,278 | * | 5/1998 | Gillet et al. ........................ 429/24 |
| 5,914,200 | * | 6/1999 | Schabert et al. .................... 429/34 |

* cited by examiner

Primary Examiner—Stephen Kalafut
Assistant Examiner—Ray Alejandro
(74) Attorney, Agent, or Firm—John J. Murphey

(57) ABSTRACT

A carbon-air fuel cell defined by an enclosed heat insulating container, a cathode supported in the container and arranged to form an air space about the inside thereof, an anode basket positioned inside the cathode, spaced-apart from the container, and containing therein a charge of carbon, a charge of molten electrolyte, in the form of a hydroxide that is selected from the group consisting of Aluminum, Calcium, Cesium, Potassium, Sodium, Rubidium, Strontium and mixtures thereof, filling the space between the cathode and the charge carbon; and, a bubbler for passing an oxygen-containing stream of gas through the cathode into the molten electrolyte where the oxygen ionizes and diffuses through to the anode basket into contact with the carbon to produce an electrical charge at the anode basket.

15 Claims, 5 Drawing Sheets

CARBON-AIR FUEL CELL

RELATION TO OTHER APPLICATIONS

This application claims the benefit of U.S. Provisional Application No. 60/031,678, filed Nov. 22, 1996 titled CARBON-AIR FUEL CELL. This application also is a continuation-in-part of Ser. No. 08/974,321 titled "CARBON-AIR FUEL CELL" filing date Nov. 19, 1997.

BACKGROUND OF THE INVENTION

1. Field of the Invention

This invention pertains to the field of metal-air electrochemical energy converters, as well as solid fuel cells. More particularly, it pertains to a fuel cell that uses carbon directly as a "fuel" anode in an electrochemical cell with atmospheric air as the oxidizer and to design and operational modifications thereof that allow the fuel cell to be commercially viable.

2. Description of the Prior Art

The element carbon (C) has an affinity for combining chemically with a large number of other chemical elements under a variety of conditions. In this instance, carbon has a chemical affinity for oxygen in the air and when brought into contact at a proper temperature, carbon enters into chemical combination with the oxygen in an exothermic reaction known as "combustion". However, as discovered by W. W. Jacques in 1896, carbon can be chemically combined with oxygen in the air, not directly as in combustion, but through an intervening electrolyte to produce predominantly electrical energy instead of heat.

This process of converting the potential energy of carbon into electrical energy has great potential for the transition to a sustainable energy infrastructure for the world's peoples. The world's oil and gas resources, as well as coal reserves, are being used inefficiently and are causing increasing pollution at an accelerating rate when used to provide heat, electricity and run industry. Although new reserves and resources are constantly being discovered, the cost of extracting them is also rising. The damage to the environment from mining, drilling and leaking pipelines, as well as inefficient and incomplete combustion, has caused pollution of the air and water, and destruction of wetlands, fishing grounds and forests.

The combination of the carbon-air fuel cell and using renewable biomass as a source of the carbon fuel (charcoal) eliminates all of these problems through the fuel cell's much higher efficiency and lower operating temperature. Also, using the solar biomass fuel cycle, there is no net increase in $CO_2$ and no emission of toxic pollutants such as NOx, SOx, CO or volatile organic compounds (VOC's). By undertaking an increase in production of certain flora, on biomass plantations, using marginal and degraded lands not in conflict with conventional agriculture, carbon dioxide can be removed from the atmosphere and converted to biomass, and thence to carbon rods, sticks, sheets, slabs, chunks and other forms such that they can become the anodes for carbon-air fuel cells. This will provide electrical power for stationary, portable and mobile applications, replacing the common internal combustion engine, diesel engine and gas turbine, giving greatly improved performance in electric vehicles over conventional lead-acid batteries.

The use of carbon directly as a "fuel" anode in an electrochemical cell was first practiced by Jacques. In his 1896 patent, he bubbled air upward through a molten salt electrolyte of sodium hydrate (caustic soda and sodium hydroxide), at a temperature between 400° to 500° C., to cause an ebullition of oxygen-saturated electrolyte that was then placed into contact with a carbon anode. The carbon was oxidized to form carbonic acid gas (carbon dioxide) and an electrochemical potential was developed between the carbon rod and the iron containment pot, that resulted in an electric current flowing through an external load connected between them. The container (from Jacques) was made from the inert metal, platinum, or Norway iron (ultra low carbon steel).

Jacques added magnesium oxide, a basic oxide, to the electrolyte, in a partially successful attempt to suppress carbonate formation. The tendency of the electrolyte was to react with the byproduct $CO_2$ to form sodium carbonate. If the carbonate builds up beyond 30% by weight of the electrolyte, it will begin to adversely affect the cell's operation. With the addition of magnesium oxide, Jacques was able to increase the operational life of his cells from several days to several months before exceeding the 30% limit. At the end of the operating time the electrolyte had to be removed from the cells and regenerated to remove the carbonate.

Anbar and Weaver's patents were different from Jacques in that they used a molten carbonate electrolyte. Their two patents included a lead anolyte, but published research results indicated they dropped the lead anolyte and reverted to the Jacques geometry in its slab form. Their cell was not commercially viable for the following reasons: the operating temperature was between 650° and 750° C.—this caused severe corrosion problems (the same problems suffered by hydrogen fueled molten carbonate fuel cells); the electrolyte conductivity is low—resulting in poor current density and power density; the electrolyte would decompose from carbonate into oxide-evolving $CO_2$. Only one of these problems has been solved technically, and that is the electrolyte decomposition. By introducing a partial pressure of $CO_2$ into the cathode air feed, the decomposition is overwhelmed by the formation of more carbonate. In a practical system, this would require recovering ⅔ of the $CO_2$ in the exhaust, and reinjecting it into the fresh air feed. The only technically feasible method for doing this at present, pressure swing absorption, is not commercially viable, and is too bulky for portable or mobile applications.

Over the years there have been improvements in electrolyte compositions, matrix materials, fabrication techniques, as well as in anode and cathode materials. Yet, no one has applied these improvements to the carbon-air fuel cell and the result has been that it has not yet become a viable alternative to the internal combustion engine, diesel engine, gas turbine or lead-acid battery.

SUMMARY OF THE INVENTION

This invention is comprised of practices which improve the performance of the carbon-air fuel cell sufficiently to make it commercially viable.

One part of this invention is to switch to a mixed molten hydroxide electrolyte and a combination of techniques for finally stabilizing it from converting into carbonate, rendering it completely invariant for periods of 10,000's of hours (many years).

Recent research shows that molten hydroxides, for a given cation, have higher ionic conductivities than molten carbonates. These higher ionic conductivities occur at considerably lower temperatures in the molten hydroxides than the lower conductivities of the molten carbonates; 450° C. versus 650° C. Mixed hydroxides form eutectics, with lower melting points than the melting points of the individual constituents. An example is the sodium hydroxide—potassium hydroxide eutectic, who's melting point is 170° C. while the melting points of the individual constituents are 318° C. and 360° C. respectively. Experience has shown that the eutectic must be superheated to about 150° C. above its melting point to achieve the desired conductivities. It has also been shown by recent research that oxygen is highly soluble in molten hydroxides, forming soluble peroxides and superoxides. These reactions can be obtained simply by bubbling air or oxygen through the melt. Other work with soluble oxidizers in fuel cells and metal-air batteries shows that for a given air cathode, a fivefold increase in current density is achieved with a soluble oxidizer versus air. An example would be an increase in an air electrode from 100 $mA/cm^2$ to 500 $mA/cm^2$. In addition to this soluble oxidizer reaction, using electrodes of higher conductivity and higher surface area, a further factor of two increase in current density is possible. As an example, the current density would increase from 500 $mA/cm^2$ to 1000 $mA/cm^2$. This is a tenfold increase over the results of Jaques, Anbar and Weaver.

The lower operating temperatures of molten hydroxides allows cheaper materials, such as ultra-low carbon steel and 300 series stainless steels, to be used to fabricate the containers and cathodes because of the lower corrosiveness of molten hydroxides compared to molten carbonates which require the more exotic Inconel®, Hastelloy®, and Kanthal® alloys. Electronic porcelain, alumina and magnesia can be used for the high temperature insulators, the alumina and magnesia for electrolyte matrices.

As stated previously, the $CO_2$ produced at the anode would normally form carbonates with the hydroxide electrolyte (Jacques problem). Recent research shows that these carbonates can be decomposed by acidic oxides and oxyanions (not the basic oxides used by Jacques) from the group Arsenic Oxide, Antimony Oxide, and Silicon Oxide, as well as Pyrophosphates and Persulfates of Sodium and Potassium added to the molten electrolyte. A partial pressure of water vapor in the air feed to the cathode would hydrolyze the oxides in the electrolyte resulting from the oxyanion reaction to hydroxides. This process renders the electrolyte stable and invariant. The partial pressure of water vapor in the air feed can be supplied by condensing the water vapor that is evolved from the electrolyte when it decomposes into carbonate, and reinjecting it into the fresh air feed through a bubbler apparatus or the like. A small tank of makeup water will compensate for minor water loss. This two-phase system (gas-liquid) is very easy to implement in a commercially viable system, unlike the pressure swing absorption system needed to recover $CO_2$ in the molten carbonate system.

Lower cost nickel and iron may be used for the cathode at these lower operating temperatures. By incorporating small quantities of titanium in the iron or nickel cathodes by powder metallurgy, ion implantation or other techniques, or small quantities of lithium, by coating them with a thin layer of lithium salts and then oxidizing them in air, the result is a doping of the surface oxide forming a degenerate semiconductor with a stable electrical conductivity and enhanced corrosion resistance.

Recent research has shown that doping carbon with small amounts of alkali metals, termed "intercalation" raises the conductivity of the carbon by a factor of ten. This would reduce the IR drops on the anode side of the cell, improving current and power density. Also, lowering the temperature to 400° C. allows copper to be used as an anode cage thus allowing the carbon to be placed in a basket and immersed in the electrolyte as a fuel. A new form of carbon, called carbon aerogel, has a very high surface area 100 times the best previous high surface carbon, which would allow higher current densities heretofore not obtainable.

Accordingly, the main object of this invention is the discovery that by incorporating a number of improvements into the basic concept of the carbon-air fuel cell makes it a commercially viable power source. These improvements include, but are not limited to:

Use of a molten hydroxide electrolyte that is rendered invariant through the addition of acidic oxides or oxyanions and humidification of the air feed so there is a partial pressure of water vapor over the melt;

The use of copper as a metallic cage or basket to hold the carbon anode, separating the functions of fuel and current collector, so that the carbon acts purely as a fuel for conversion directly into electricity, the cage/basket also increasing current and power density;

A fuel cell which uses biomass as the source of carbon either directly or in the form of charcoal or mixed with wood pitch and molded into sticks, rods, sheets, slabs, plates, or other shapes suitable for anode fuel elements, the combination of biomass source and fuel cell converter becoming the first completely sustainable and renewable energy cycle that can be implemented on a global scale with no net increase in $CO_2$ and no NOx, SOx, CO or VOC emissions.

These and other objects of the invention will become more apparent by reading the following Description of the Preferred Embodiment taken together with the drawings that are appended hereto. The scope of protection sought by the inventor may be gleaned from a fair reading of the claims that conclude this specification.

DESCRIPTION OF THE PREFERRED EMBODIMENT

Figure 1:
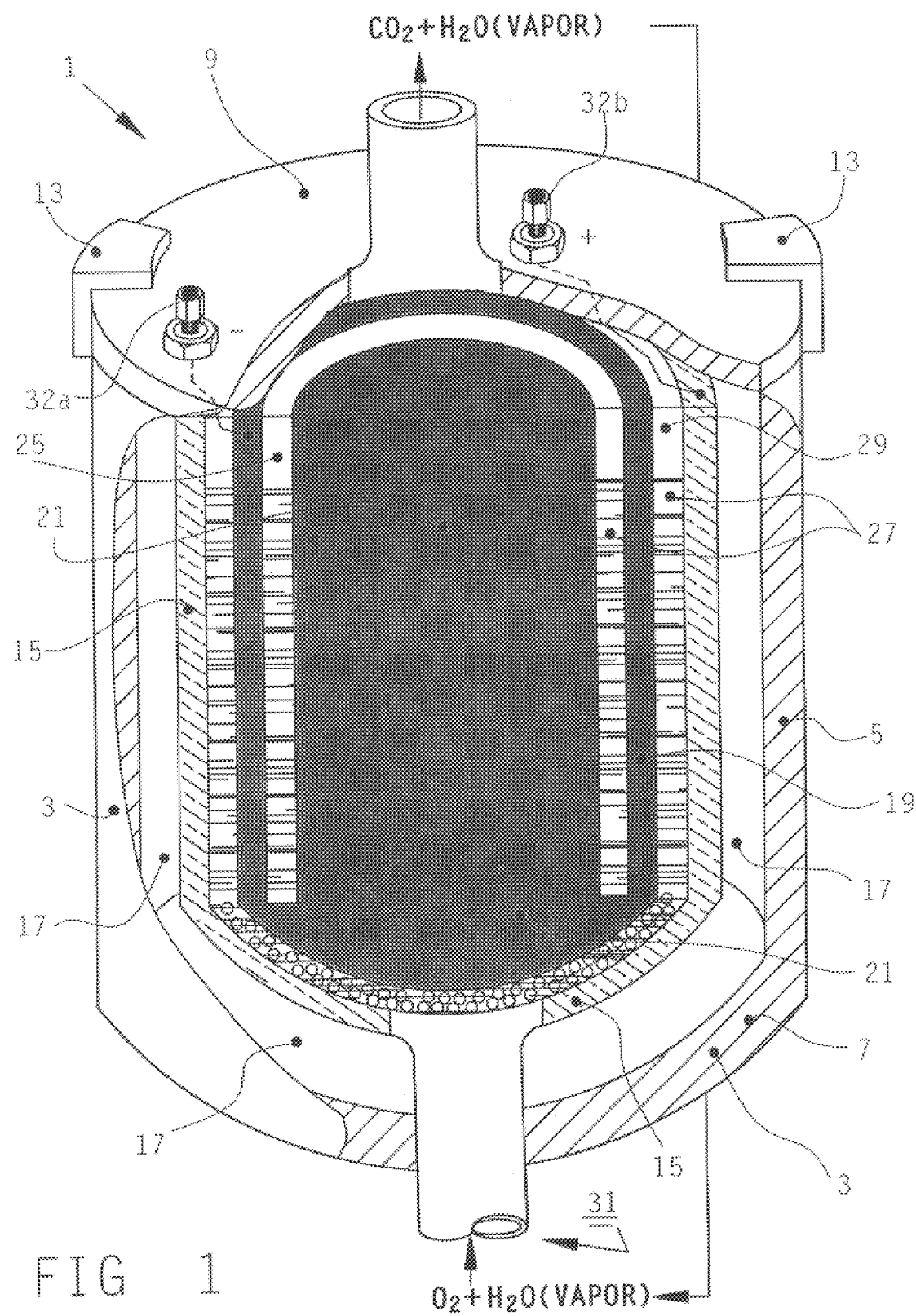
FIG. 1 is a side elevation view, partially in section, of an carbon-air fuel cell of this invention wherein the carbon is shaped in a cylindrical shell in a flooded electrolyte.

Turning now to the drawings where like elements are identified with like numerals throughout the five figures, FIG. 1 shows the preferred embodiment of this invention 1 to be made of a heat insulating container 3 such as in the form of a Dewar flask, namely a double-walled flask with a vacuum between the walls, and made of a typical structural metal like stainless steel. Container 3 is shown to be comprised of a cylindrical side wall 5, a sealed bottom cover 7 and a top 9 that is closed over a latch 13.

An air cathode 15 is supported in container 3, preferably concentrically therein so as to allow an air space 17 to exist there between. Inside cathode 15 is positioned an anode basket 19 containing a shaped charge 21 of biomass carbon. Between charge 21 and the inside wall of anode basket 19 is a space 25 that is filled with a charge 27 of molten electrolyte in the form of a hydroxide that is selected from the group consisting of Aluminum, Calcium, Cesium, Potassium, Sodium, Rubidium, and Strontium. The preferred electrolyte is sodium hydroxide and its operating temperature is about 400° C. Other electrolytes may be formed from eutectic mixtures of hydroxides of Aluminum, Calcium, Cesium, Potassium, Sodium, Rubidium, and Strontium. Operating temperatures of these eutectic mixtures can be as low as 100° C.

Figure 4:
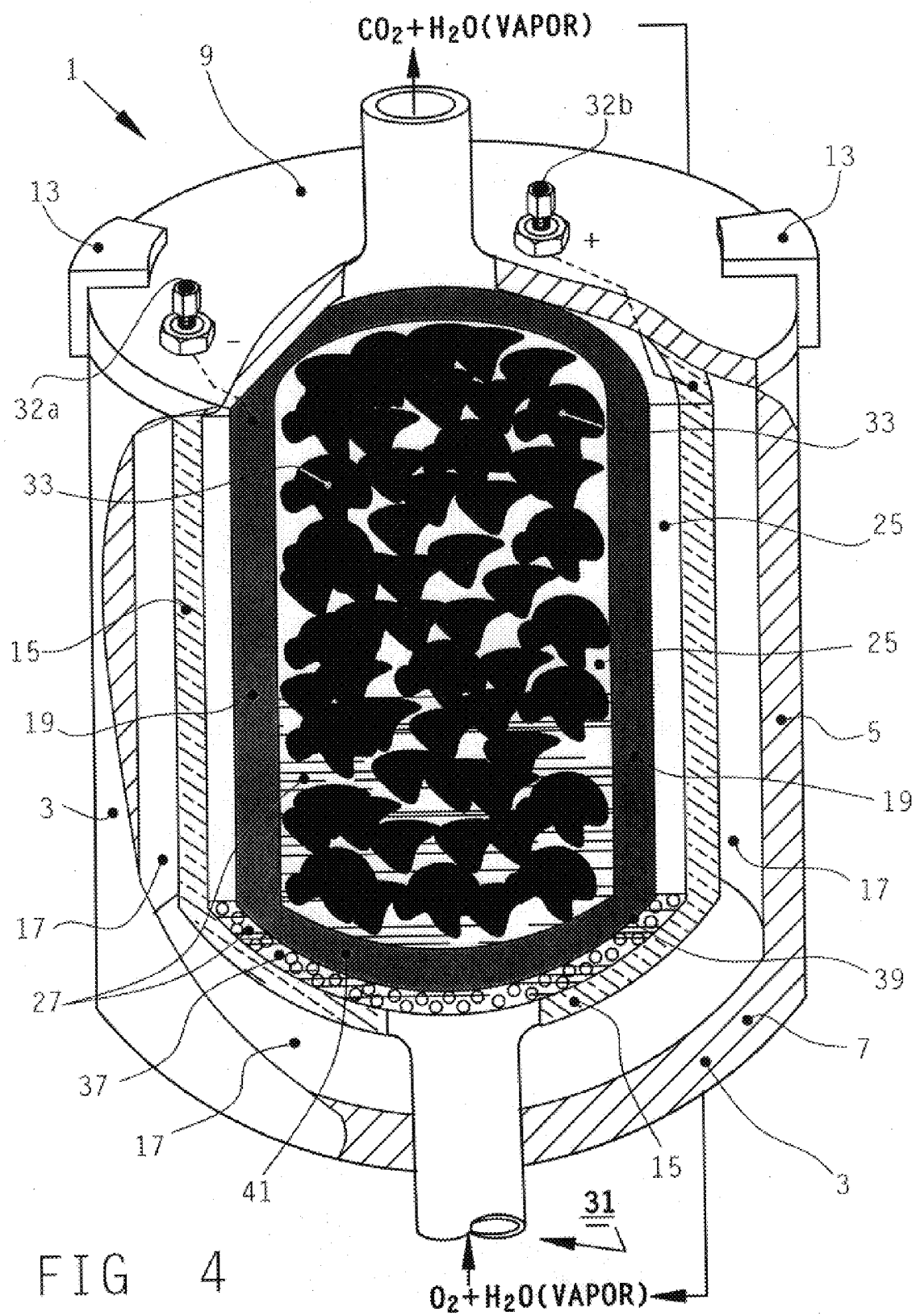
FIG. 4 is the same fuel cell shown in FIG. 3 except the carbon is shown in chunks and carried in a basket that serves as the anode; and, FIG. 5 is a side elevation view, partially in section of a carbon-air fuel cell of this invention wherein the carbon is shaped into a bipolar stack made from the high surface intercalated carbon in the form of disks or plates.

Between anode basket 19 and cathode 15 is another space 29 that is partially filled with the same charge 27 of molten electrolyte. Means 31, such as a common bubbler shown in FIG. 4, is provided to pass air (oxygen) or a charge of gas containing oxygen through cathode 15 where it ionizes to oxygen ions in electrolyte charge 27 and then the ions diffuse through the electrolyte to anode basket 19 into contact with shaped carbon charge 21. Upon reaching charge 21, the oxygen ions combine with the carbon and produces electricity at anode basket 19.

$CO_2$ is produced as a gas at anode basket 19. It combines with the hydroxide electrolyte to form carbonates. These carbonates are exposed to acidic oxides and oxyanions selected from the group consisting of Arsenic Oxide, Antimony Oxide, Silicon Oxide, and Pyrophosphates and Persulfates of Sodium and Potassium, by processes already known in the art, to produce basic oxides. These products are then subjected to water vapor to hydrolyze the basic oxides to hydroxides and these hydroxides are soluble and dissolved in the molten hydroxide electrolyte. This process makes the electrolyte stable and invariant. The $CO_2$ and unused water vapor are drawn off by means 32.

The operating temperature of molten sodium hydroxide is about 400° C. This allows stainless steel to be used as container 3. During operation of battery 1, the inside surface of the stainless steel, in contact with the molten electrolyte, begins to oxidize. A thin layer of oxide forms on this inside surface and this does not adversely affect the operation of the fuel cell. However, should the oxide layer become too thick, it will reduce the ability of electrons to penetrate the layer and enter the reaction. It has been found that doping the oxide layer with small additions of Lithium or Titanium will stabilize the electrical conductivity of the oxide layer at a high value.

Electricity produced by the fuel cell shown in FIGS. 1–4 may be removed at exterior poles 32a and 32b that are connected respectively to anode basket 19 and air cathode 15 by wires as shown.

Figure 2:
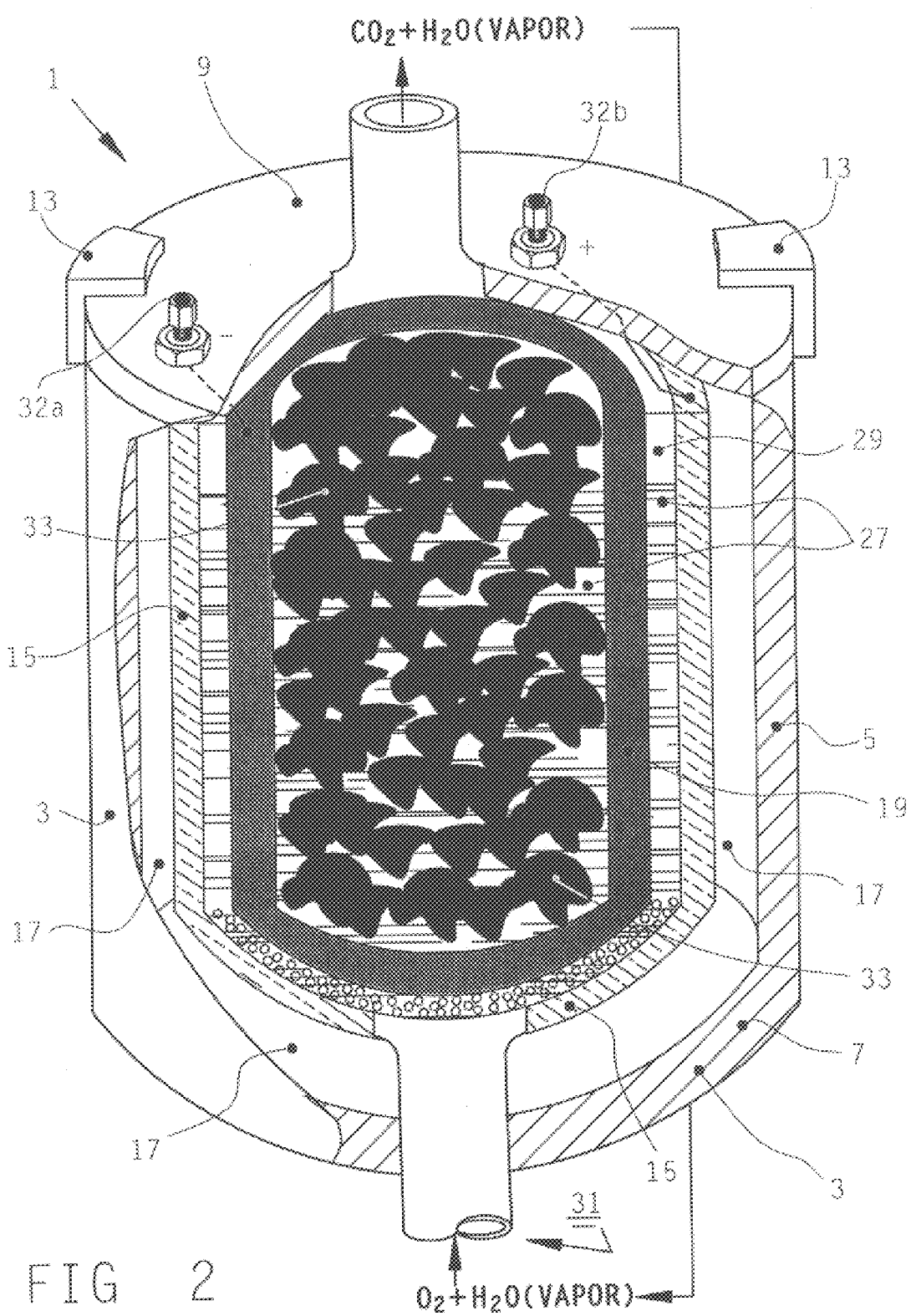
FIG. 2 is the same battery shown in FIG. 1 except the carbon is shown in chunks and carried in a basket that serves as the anode.

Increasing the conductivity of the carbon is also a method of increasing the power density of the fuel cell. It has been determined that intercalation, a process by which doping the carbon with from 2% to about 4% by weight of an alkali metal like Lithium, Sodium or Potassium increases the conductivity of the carbon by at least a factor of ten. As shown in FIG. 2, the same fuel cell as shown in FIG. 1 can be changed slightly to allow chunks 33 of carbon to be used as a fuel instead of shaped charge 21. The chunks of carbon can be obtained by the destructive distillation of many carbon-containing materials such as discarded wood, boxes and other paper products, and garbage. The chunks of carbon produce a greater surface area for exposure to electrolyte charge 27 thus increasing the current density of the fuel cell.

Figure 3:
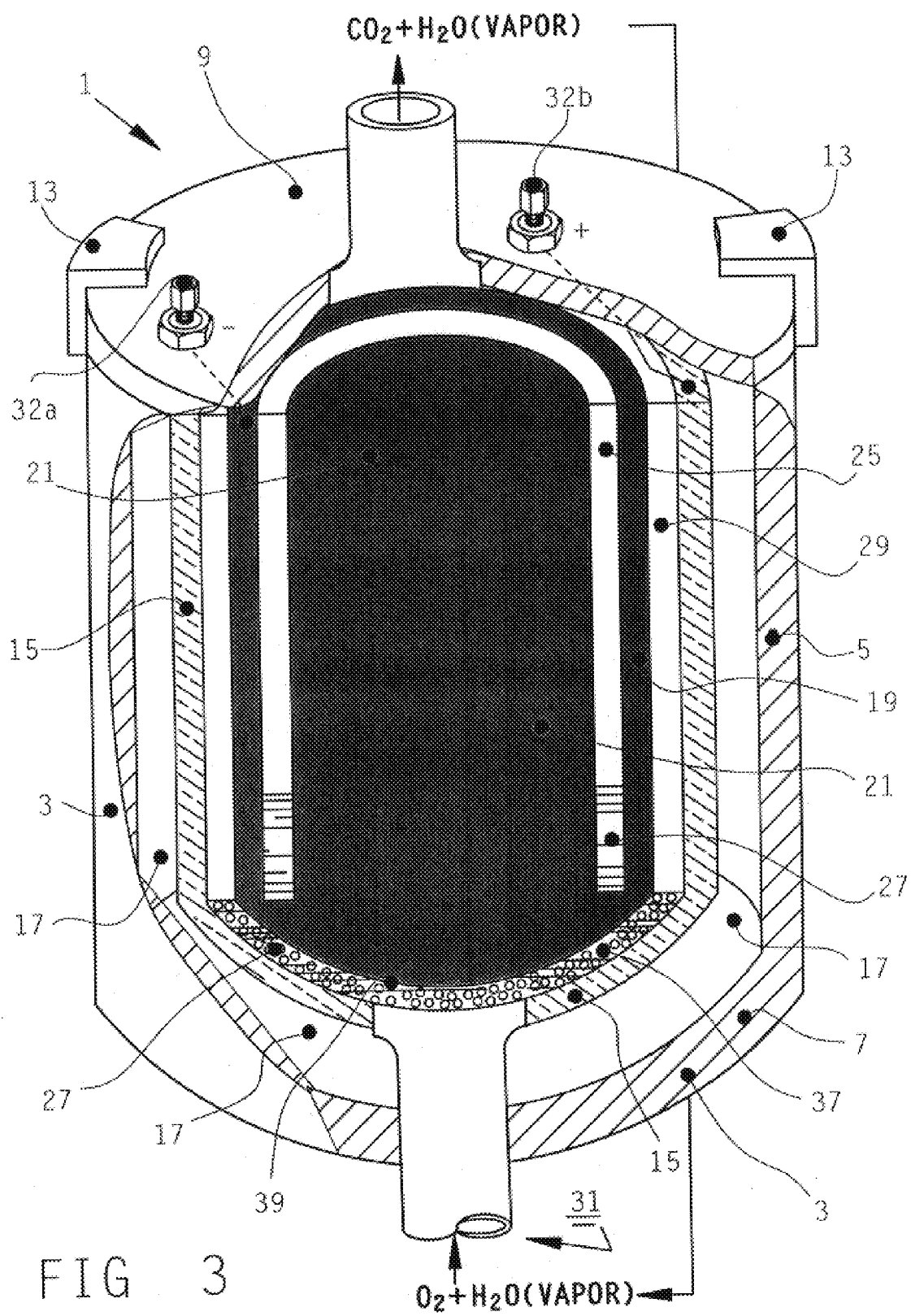
FIG. 3 is a side elevation view, partially in section of an carbon-air fuel cell of this invention wherein the carbon is shaped in a cylindrical shell and the electrolyte is in a matrix, the matrix being a disk or plate, so that only the bottom of the carbon fuel element is in contact with the electrolyte.

FIG. 3 shows a fuel cell similar to that shown in FIG. 1 except that electrolyte charge 27 is restricted to a matrix 37 of Alumina or Magnesia wherein the electrolyte is spread evenly there through. The interface 39 between carbon charge 21 and electrolyte charge 27 is limited to the intersurface contact between the carbon and the upper surface of matrix 37.

FIG. 4 is quite similar to the fuel cell construction shown in FIG. 3 in that matrix 37 is used to provide electrolyte contact between cathode 15 and anode basket 19. Anode basket 19 is filled with chunk of carbon 33 and a little electrolyte is provided therein to contact the surface of the chunks. Again, air is introduced into the battery which ionizes, so that the ions diffuse through electrolyte matrix 37 into anode basket 19 to set up the chemical reaction.

While monopolar cells are applicable to general stationary and some portable applications, for more power density, such as may be required in mobile/transportation applications, bipolar electrode geometry may be used. Bipolar electrode geometry appears to be able to increase the power density above the 500 W/lb threshold for such uses as land transportation applications and increase the power density by a factor of ten over that possible with monopolar cell geometry. This is due mostly to the reduced IR drops through the electrodes and to a lesser extent through lower IR drops through the electrolyte. This would effectively increase the present 60 W/lb power density of the monopolar cell to 600 W/lb for a bipolar geometry. The reason for building monopolar cells is that they are cheaper to fabricate than the bipolar geometry, even in large quantities.

Figure 5:
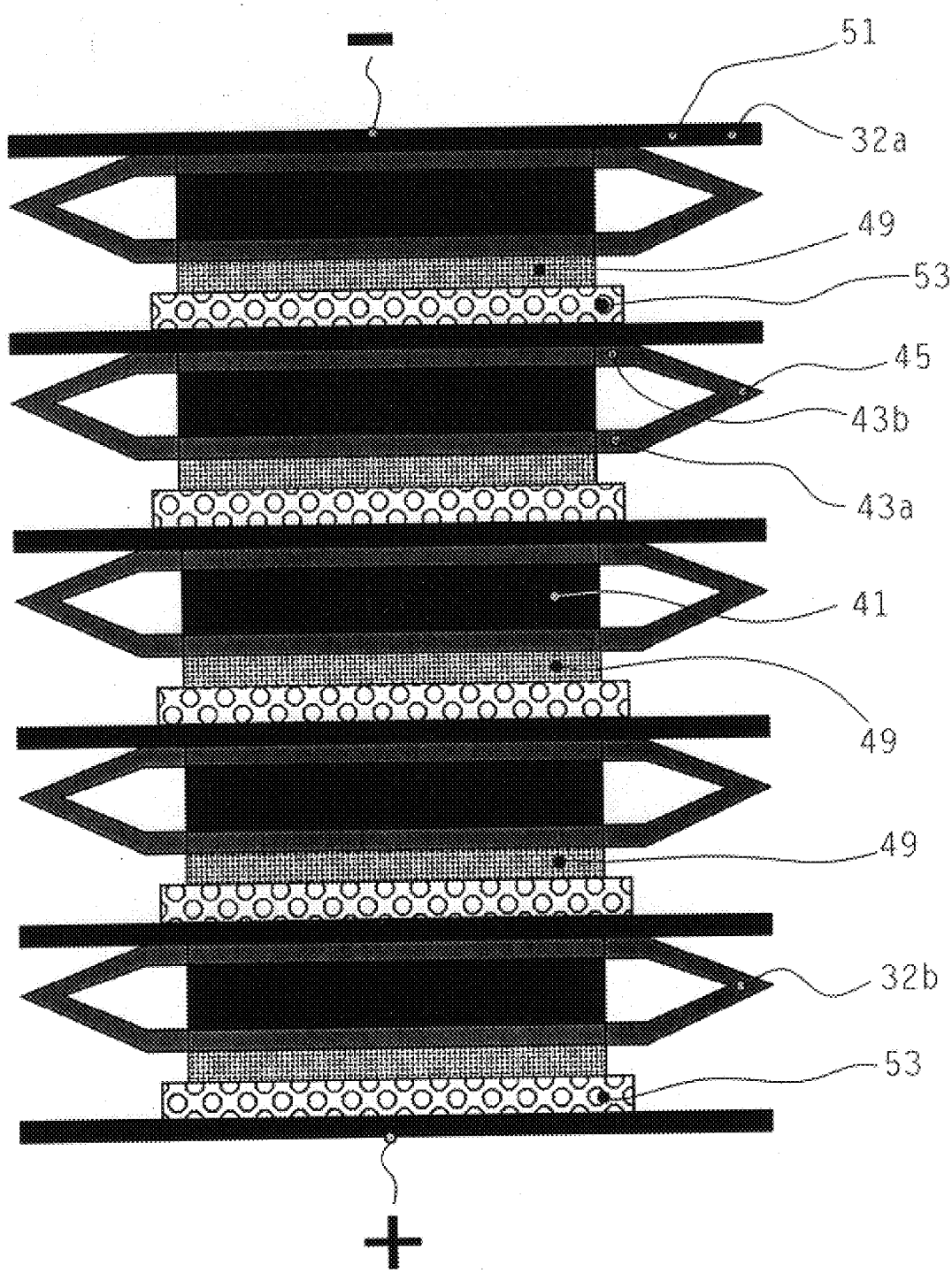

FIG. 5 shows a bipolar multicell battery wherein a plurality of shaped charges of carbon intercalcated with acidic oxides and oxyanions selected from the group consisting of arsenic oxide, antimony oxide, silicon oxide, and pyrophosphates and persulfates of sodium and potassium, in the form of flat washers or plates 41, are stacked together in alignment to form an anode packet. Each plate 41 is sandwiched between a pair of anode plates 43a and 43b that are, themselves, sealed about their respective circumferences 45. Each anode-covered plate is sandwiched on one side by a layer 49 of paste molten electrolyte of the type previously described herein and, on the other side, by a foam metal air cathode 51 of the type containing reticulated metal foam that allows the passage of air there through. Bipolar plates 53 separate each plate anode to prevent air or oxygen reaching the anodes directly. This arrangement can be used to provide a fuel cell with additive electric voltage, if wired in series, and additive voltage and additive amperage if wired in series/parallel.

Using the teachings of this invention, the following performance has been achieved by the inventor from a monopolar cell: open circuit voltage=0.715 volts; maximum current density=98 mA/cm$^2$. The cell was able to maintain over 5 Amps continuous current for 4 hours. Based on a theoretical current capability of 8.62 Ah/g, the current efficiency was 83.46%. The overall efficiency (voltage efficiency times the current efficiency) was 56%.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the same way to achieve substantially the same results are within the scope of this invention.

What is claimed is:

1. A carbon-air fuel cell comprising:
   a) a heat insulating container;
   b) a cathode supported in said container and arranged to form an air space about the inside thereof;
   c) an anode basket positioned inside said cathode, spaced-apart from said container, and containing therein a charge of carbon;
   d) a charge of molten electrolyte, in the form of a hydroxide that is selected from the group consisting of aluminum, calcium, cesium, potassium, sodium, rubidium, strontium and mixtures thereof, at least partially filling said space between said cathode and said carbon charge;
   e) means for passing an oxygen-containing stream of gas through to said cathode, where it will ionize and pass into said molten electrolyte and then to said anode basket and into contact with said carbon, to produce an electrical charge at said anode basket and $CO_2$; and,
   f) means external said container for drawing off the electricity from said anode basket and said cathode and separate means for drawing off the unused water vapor and $CO_2$ produced inside said container.

2. The carbon-air fuel cell of claim 1 wherein said oxygen-containing stream of gas contains water vapor and said electrolyte is intercalated with acidic oxides and oxyanions selected from the group consisting of arsenic oxide, antimony oxide, silicon oxide, and pyrophosphates and persulfates of sodium and potassium.

3. The carbon-air fuel cell of claim 1 wherein said water vapor is recovered from the $CO_2$ produced from the carbon-electrolyte interaction for recycling back into said oxygen-containing stream.

4. The carbon-air fuel cell of claim 1 wherein said heat insulating container includes a side wall, a bottom cover and a top cover closed and sealed there over and said cathode is an air cathode supported in said container and arranged to form an air space about said inside surface of said container side wall.

5. The carbon-air fuel cell of claim 1 wherein said charge of carbon is a shaped charge.

6. The carbon-air fuel cell of claim 1 wherein said container comprises stainless steel.

7. The carbon-air fuel cell of claim 1 wherein said container is in the form of a Dewar flask.

8. The carbon-air fuel cell of claim 1 wherein said cathode is concentrically housed in said container.

9. The carbon-air fuel cell of claim 1 wherein said carbon is bio-mass carbon.

10. The carbon-air fuel cell of claim 1 wherein said carbon is a shaped mass of carbon.

11. The carbon-air fuel cell of claim 1 wherein said carbon is in the form of chunks.

12. The carbon-air fuel cell of claim 1 wherein said electrolyte is confined to a matrix.

13. The carbon-air fuel cell of claim 12 wherein said matrix is selected from the group consisting of alumina, magnesia and mixtures thereof.

14. The carbon-air fuel cell of claim 12 wherein said matrix and electrolyte is in contact with only one surface of said charge of carbon.

15. A carbon-air fuel cell comprising:
   a) a heat insulating container, including a side wall, a sealed bottom cover and a top closed there over;
   b) an air cathode supported in said container and arranged to form an air space about said inside surface of said container side wall;
   c) an anode basket positioned inside said air cathode, spaced apart from said container, and containing therein a shaped charge of carbon;
   d) a charge of molten electrolyte, in the form of a hydroxide that is selected from the group consisting of aluminum, calcium, cesium, potassium, sodium, rubidium, strontium and mixtures thereof, at least partially filling said space between said air cathode and said carbon and confined to a matrix selected from the group consisting of alumina, magnesia and mixtures thereof;
   e) means for passing a wet oxygen-containing stream of gas through said cathode into said charge of molten electrolyte for ionization of said oxygen and then passing said oxygen ions through said anode basket into contact with said carbon to produce $CO_2$ and an electrical charge at said anode basket;
   (f) means external said container for drawing off the electricity produced inside said container; and,
   (g) means for drawing off the $CO_2$ and unused water vapor generated inside said container.

* * * * *